United States Patent
Shirmohamadi (12) 
(10) Patent No.: US 6,864,421 B1
(45) Date of Patent: Mar. 8, 2005

(54) SAG COMPENSATING DEVICE FOR SUSPENDED LINES

(75) Inventor: Manuchehr Shirmohamadi, Castro Valley, CA (US)

(73) Assignee: Power Transmission Solutions Inc., Berkeley, CA (US)

( * ) Notice: Subject to any disclaimer, the term of this patent is extended or adjusted under 35 U.S.C. 154(b) by 0 days.

(21) Appl. No.: 10/649,174

(22) Filed: Aug. 26, 2003

Related U.S. Application Data (60) Provisional application No. 60/407,060, filed on Sep. 3, 2002.

(51) Int. Cl.[7] ............................. H02G 7/00; H02G 7/20
(52) U.S. Cl. ............... 174/40 R; 174/45 R; 174/45 TD
(58) Field of Search ................... 174/40 R, 40 CC, 174/40 TD, 41, 42, 45 R, 45 TD, 137 R, 138 R (56) References Cited

U.S. PATENT DOCUMENTS

| 3,044,763 | A | | 7/1962 | Jorzenink |
| 3,729,172 | A | | 4/1973 | Casalta |
| 3,993,197 | A | | 11/1976 | Tann |
| 4,616,103 | A | | 10/1986 | Balteau |
| 4,695,677 | A | | 9/1987 | Ruth |
| 5,792,983 | A | * | 8/1998 | Shirmohamadi ....... 174/45 TD |
| 6,057,508 | A | | 5/2000 | Shirmohamadi |

FOREIGN PATENT DOCUMENTS

| DE | 2628250 A | * | 1/1978 | ............ H02G/7/08 |
| SD | SU 974483 A | * | 11/1982 | ............ H02G/7/02 |

* cited by examiner

Primary Examiner—William H. Mayo, III
(74) Attorney, Agent, or Firm—Adam Bell (57) ABSTRACT

A device that automatically compensates for heat-induced sag in a suspended line by using a shape memory alloy actuator. As the actuator it is heated, it contracts, producing a pulling force in the line, and thereby reducing sag.

12 Claims, 8 Drawing Sheets

SAG COMPENSATING DEVICE FOR SUSPENDED LINES

This non-provisional patent application claims the benefit of U.S. provisional No. 60/407,060 filed 3 Sep. 2002 entitled "Tensile Force Line Tensioner."

FIELD OF INVENTION

This invention relates to devices for holding electrical transmission lines to each other and to towers and the like, and more specifically to such devices that can automatically compensate for changes in transmission line sag.

DESCRIPTION OF THE PRIOR ART

Transmission power lines are electrical lines that typically carry high voltage, e.g., 230 KV. For reasons of safety, such lines are suspended well above ground level, typically from towers or the like. FIG. 1 shows towers 10 and 20 that suspend a power line 30. (Although in practice the towers will have extension arms and will carry several lines, for ease of illustration, FIG. 1 has been simplified.) Power line 30 is suspended from towers with insulating devices 40, for example ceramic or glass and rubber and fiberglass insulators whose length can range from a few inches, such as six inches, to over fifteen feet, such as twenty feet, depending on the voltage in the line and the environment.

Power lines, which are generally supported by transmission towers, cover large distances. Due to the force of gravity, power lines intrinsically tend to sag. This initial sag increases with line temperature because the conducting material of which the line is made expands as line temperature increases, effectively lengthening the line. A small increase in line length produces a large, and potentially hazardous increase in sag. For example, for a line with a 500 foot tower spacing (a typical span for overhead transmission lines) and an aluminum conductor steel reinforced (ACSR) conductor (drake), a temperature increase of about 120° F. (from 100° F. to 212° F. which can represent the expected conductor temperature change between winter and summer months) will causes about 6.4 inches increase in line length, which will increase the sag by about 4.7 feet. For the purpose of this calculation, line tension at 40° F. was set to 20% of the conductor breaking load (a common practice by the transmission line designers).

Increase in line temperature may be due to a number of factors including increased ambient air temperature, decreased wind flow over the line and increased current flow through the line. Sagging power lines create fire hazards and other public safety issues due to ground clearance. The cost of line sag in terms of energy not sold and also tree trimming and litigation expenses are very well known to the electricity generation and transmission industry.

FIG. 1 illustrates line sag. The phantom-line version of power line 30, 30' represents the power line's position at a temperature of $T_1$, such that temperature $T_1$ is greater than temperature $T_0$. The distance from the sagging line to the ground is represented by y. The extent of the sag is indicated by the distance Dy between the power line 30 and the phantom power line 30'. H is the height of the towers and Dx is the span length. Such sag can reduce the clearance between ground and the transmissions lines. The problem of sagging power lines is well known to the electric power industry and is associated with problems which are hazardous and which are both time consuming and expensive to rectify. Sagging power lines pose an electrocution hazard to persons and vehicles and can lead to interruption in power supply and are known to cause hugely destructive and expensive forest and brush fires.

The same problem of sag also affects all other suspended structures such as bridges, suspended telecommunications wires and structural cables. (not really for this case!). Such wires and cables include cables used in construction of buildings and bridges. Additionally the same problem may affect any wire that is under tension, such as guide wires and cables used for transmitting force from a control to an instrument such as may be used in boats and aircraft and cars and other machines to, for example, control a rudder or aerolon or braking system.

Figure 1A:
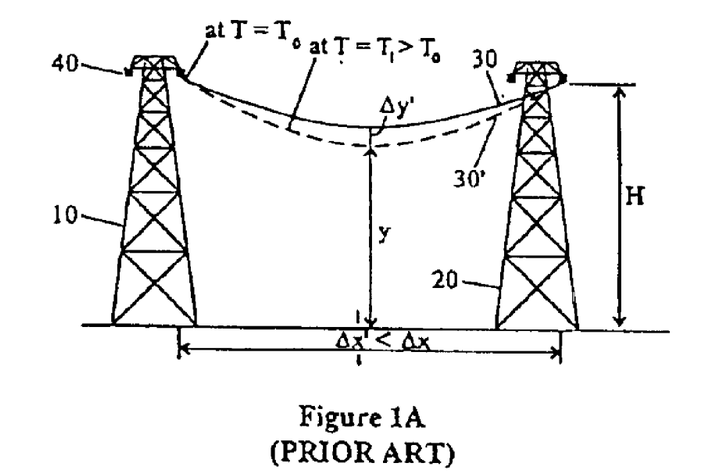
FIG. 1A depicts a generic power line transmission system according to the prior art wherein the problem of line sag has been mitigated by shortening the distance between adjacent towers to reduce span length and thus reduce line sag.
Figure 1B:
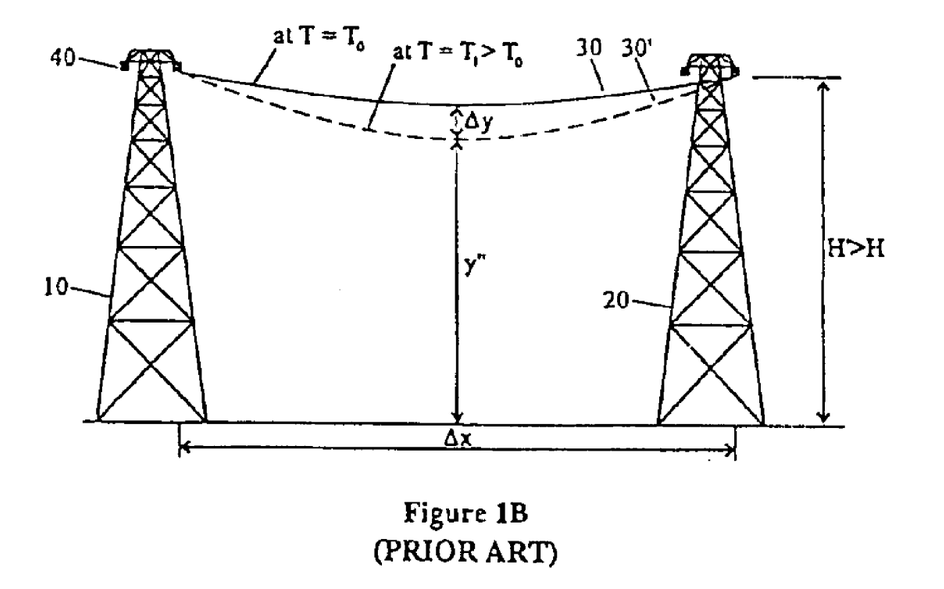
FIG. 1B depicts a power line transmission system according to the prior art wherein the problem of line sag has been mitigated by erecting taller transmission towers to accommodate line sag.

Present techniques to compensate for such sag caused by undesired increase in length of a cable include:
(i) Shortening the distance between adjacent towers to reduce span length and thus reduce line sag; this is shown in FIG. 1A wherein Dx' is shorter than Dx and wherein Dy' is shorter than Dy.
(ii) Erecting taller transmission towers to accommodate line sag; this is shown in FIG. 1B in which H' is greater than H and y" is greater than y.
(iii) Replacing exiting conductors with new ones with higher ampacity or lower sag characteristics.
(iv) Retro-fitting existing towers to increase height.
(v) Limiting electrical current load capacity to compensate for increased ambient temperature.
(vi) Other methods for reducing sag and for keeping a suspended line taught include the use of constant tension elements such as springs and pre-stressed tensioners and even the use of strategically placed weights on the suspended line.
(vii) Other methods for combating sag have been disclosed in previous patents to the inventor, Manuchehr Shirmohamadi: U.S. Pat. No. 6,057,508 and U.S. Pat. No. 5,792,983 and PCT US9917819, W00008275A1 all of which are hereby incorporated by reference. These previous solutions automatically compensate for thermally induced line sag by exploiting the concomitant thermal expansion of a coupling member or actuating rod. But these previously disclosed solutions require an amplification means that includes one of the following: dual scissor arms (FIGS. 3, 4, 9, 10, 11) or a dual rotary system (FIG. 5) or a single rotary system (FIGS. 6, 7a, 7b, 7c) or a skewed gear system (FIGS. 8, 8b, gc). All of these previous solutions use a thermally-expanding actuating rod that produces compressive forces that are used to mitigate sag. None of these previous solutions use a coupling member that contracts, producing tensile forces that are used to reduce sag. These solutions, while effective, require a good deal of engineering and manufacturing effort. There is a need for B device that mitigates sag in a suspended line, that employs the principles of thermal expansion of an actuating rod, that is also simple and easy to manufacture and easy to install.
(viii) Certain other methods are disclosed in the Soviet patents and inventor certificates numbers 454627, 754541, and 974483. These old Soviet solutions are interesting in that they use a shape memory alloy (SMA) to tighten a line. Essentially it works by simply taking a length of SMA and attaching one end to a spot on the power line and a the other end to another spot on the power line, so that the SMA lies approximately parallel to the power line. Current passes through the SMA, which shortens, tensioning the line. But this approach has been tested and does not work. Firstly, because the power line is uncut, when the SMA tightens, a large hanging loop is formed below the position of the main line. This sag is itself, a problem. Secondly, the frequent flexing of the power line fatigues the line, which eventually breaks. Additionally, the Soviet devices are different from the present invention because: they do not cut the line, but simply make a "bubble" by attaching the SMA along the length of the uncut line; and unlike our invention, since they keep the line in tact, it will be difficult to prevent the current passing through the line, and not the SMA.; and also the Soviet system employs no magnification; and also our invention has a "safety link" that eliminates mechanical load carrying by SMA at cold conditions and produces an insurance if the SMA is damaged/broken for any reason.

Current in the line causes line temperature to rise and resistance to increase—leading to still further temperature increase. The temperature increase causes the line to sag due to thermal expansion of the line. This is particularly important at times of peak demand such as during the hot days of summer when demand for air conditioning is high. High ambient temperature, high sun radiations, as well as ambient conditions with low to no wind also contribute to line sag by increasing the effective temperature of the line.

Seasonal changes in ambient air temperature is also a significant contributor to line sag. To compensate for increased ambient air temperature during warm summer months, electric utilities must often reduce current conducted by the power lines at the very time when demand may be highest, e.g., to power air conditioners. Such current limitation may be in the 30% range during summer months, which results in economic losses to the power utility due to inability to meet demand. Needless to say, erecting higher and/or more closely spaced towers represents a further economic cost to the power utility.

There is a need for a device that can be used to re-rate transmission power lines to carry greater amounts of electricity, which can automatically compensate for changes in conductor temperature to reduce thermal sag in the associated power lines. Preferably such devices should be inexpensive to fabricate, inexpensive to install, and substantially maintenance free. The present invention discloses such a device, and a method for reducing sag caused by temperature increase in suspended electrical transmission wires.

SUMMARY OF THE INVENTION

The Sagging Line Mitigator (SLIM) and the SmartConductor automatically compensate for sag in a suspended or hanging line, such as a power line. Both use a material that changes its dimensions as a function of temperature. One such material is shape memory alloy (SMA) which undergoes a phase transformation upon temperature change (referred to as transition) and produces a significant change in size and geometry. In this invention, both SLIM and SmartConductor use an SMA to conduct all, some or none of the total current in the power line. The SMA is heated by resistive heating (power loss=resistanceXcurrent^2) of the SMA or by conduction from the conductor which itself is undergoing temperature increase due to resistive heating caused by current or by a combination of both methods. As the temperature of the SMA changes, it goes through the transition and will change shape accordingly. In this invention, the SMA will contract as its temperature increases. The contraction of the SMA produces a pulling force (increasing tensile force) which is directly (for SmartConducor) or indirectly (for SLiM) transferred to the suspended line, effectively pulling in the slack and reducing sag. SLIM uses at least one lever to amplify the SMA length change and transfer it to the suspended line. The Smart Conductor does not use any lever and the length change of the SMA is applied to the suspended line directly, without any magnification.

The devices may be installed between the tower and the suspended line, or may be installed within the span of the suspended line. Both devices may be installed using techniques similar to those used for installation of a "splice" or a "dead-end" on such lines. The "splice" technique is achieved by cutting the line at two positions at a given distance from each other and installing the device by connecting the device ends to the cut ends of the line. In case of a "dead-end" technique, installation is achieved by cutting the power line at one location at a given distance from its end connecting point to a fixed structure, such as a tower, and installing the device between the cut location of the line and the fixed structure and connecting the ends of the device to the cut end of the line and the fixed structure. Also, multiple devices can be installed in series if needed by cutting longer pieces of the power line.

Many different types of shape memory alloy (SMA) are known, for example, common SMA's include the following:
Nickel/Titanium alloys
Copper/Zinc/Aluminium Alloys
Copper/Aluminium/Nickel Alloys Other alloys that are known to display shape memory properties are:
Silver/Cadmium Alloys
Gold/Cadmium alloys
Copper/Tin alloys
Copper/Zinc alloys
Indium/Titanium alloys
Nickel/Aluminium alloys
Iron/Platinum alloys
Manganese/copper alloys
Iron/Manganese/Silicon alloys A good reference book describing SMA is "Shape Memory Alloys" (CISM International Centre for Mechanical Sciences: Courses and Lectures) M. Fremond & S. Miyazaki (Editors).

The invention may take many different embodiments, some of which are set out below, depending on the arrangement of structural elements. But each embodiment does the same thing, mitigates line sag, in essentially the same way, by reducing the effective length of a power line through a direct or mechanically amplified change in the length of a SMA or other materials which will undergo dimensional change with temperature change.

The objects and advantages of the invention include, but are not limited to:

(i) provision of a means of mitigating power line sag which is considerably less expensive than current means;

(ii) provision of a means of mitigating power line sag which is automatic and self-adjusting such that the same change in ambient conditions (temperature, wind speed and direction, and solar radiation) that causes the line to sag will concomitantly cause the invention to act to mitigate the line sag;

(iii) provision of a means of mitigating power line sag which is automatic and self-adjusting such that the same change in line current (ampacity) that causes the line to sag will concomitantly cause the invention to act to mitigate the line sag;

(iv) provision of a means of mitigating power line sag without the necessity of to replacing the power line with a new one with higher current capacity or lower sag characteristics;

(v) provision of a means of mitigating power line sag without the necessity of doubling or tripling (bundling) the power line with more conductors;

(vi) provision of a means of mitigating power line sag without the necessity of retrofitting transmission towers to make them taller;

(vii) provision of a means of mitigating power line sag which will allow transmission towers to be spaced at greater intervals than is presently necessary, thereby necessitating the erecting of fewer transmission towers;

(viii) provision of a means of mitigating power line sag which will allow the building of shorter transmission towers than is presently necessary;

(ix) provision of a means of mitigating power line sag without reducing line current (ampacity);

(x) provision of a means of mitigating power line sag which is inexpensive to manufacture and install, and is essentially maintenance-free.

Other features and advantages of the invention will appear from the following description in which the preferred embodiments have been set forth in detail, in conjunction with the accompanying drawings.

BRIEF DESCRIPTION OF THE DRAWINGS

FIG. 1 depicts a generic power line transmission system according to the prior art showing the problem of line sag;

DESCRIPTION OF THE INVENTION

The inventor has invented a device for controlling and mitigating transmission line tension/sag.

Sagging Line Mitigator (SLiM)

SLiM is a new class of transmission line hardware that fixes the high temperature sag problem by using a material which reacts to temperature change by significantly changing its own size and geometry, such as a shape memory alloy (SMA). SLiM reacts to increasing conductor temperature by decreasing the effective length of conductor in the span. The material component that affects the change in length is referred to as an "actuator." In one embodiment, the material used in the actuator is a Shape Memory Alloy (SMA) that shortens as its temperature increases, and the change in length of the actuator produces a pull that is amplified and transfered to the transmission line using a single lever system. Other embodiments may use more than one lever to amplify the motion of the actuator onto the power line. The effect is a decrease in line sag during high temperature operation that may-be further transmitted through several adjacent spans, depending on construction specifics.

How SLiM Functions

SLiM uses a Shape Memory Alloy and is activated by the same temperature changes that cause a conductor to sag. The device is passive—there are no motors or electronic controls. As temperature increases, the SMA contracts and the SLiM device changes its geometry to apply a pull on the line thereby decreasing line length. As conductor temperature returns to normal, SLiM returns to its original geometry. It does not need to be reset and is always ready to respond to the next conductor temperature fluctuation.

The actuator element (using shape memory alloy) of SLiM forms part of the conductor, so that a part or all of the total current is conducted through the actuator when in use. The rest of the current is conducted through another element of the device such as the body, which may be formed of one or more hollow tubes. In certain embodiments, the SMA is surrounded by the hollow tube (pipe) body. The body in one embodiment acts both as a structural element for the lever action and as a housing to reduce the corona emitted by the device.

A SMA has a start transition temperature and a stop transition temperature at which the physical change (transition) begins and ends. The amount of current required must be sufficient to cause a temperature increase such that the SMA experiences a full or partial transition from one shape or length to another. The temperature required to cause transition is a function of the SMA being used, its dimensions and properties, and may be measured by conducting various, and in most cases customary mechanical and electrical testing on the given SMA.

SmartConductor

The actuator in the SmartConductor is also made of the similar material (in this case, shape memory alloy) as SLiM. However, the actuator is wrapped inside an aluminum or other conductive materials similar to the construction of the overhead transmission lines, e.g. ACSS (Aluminum Conductor Steel Supported) which has steel core cables wrapped by multiple layers of aluminum wires. The temperature increase on the SmartConductor actuator is primarily by direct heat transfer (conduction) from the aluminum cover which itself heats due to normal resistive heating. Temperature increase of the SmartConductor will cause its SMA core to go through partial or full transition and reduce the effective length of the SmartConductor and hence the power line in the span. SmartConductor does not use any amplification system as does SLIM, but simply reduces the length of the transmission line by an amount equal to the amount of shortening of the SmartConductor. Despite the lack of amplification, the inventor has calculated that the conductor length reduction provided by SmartConductor will be adequate for many applications. Furthermore, multiple or longer Smart Conductors can be placed on power lines to increase its effect on the line. Furthermore, SmartConductor may be manufactured as a new conductor for new installations or replacing existing lines of overhead transmission lines which will let the line operate at higher temperatures and lower sags than existing conductors such as ACSR or ACSS.

SmartConductor is a simpler device than SLiM (which itself is of considerably less complexity than previous systems) and may be manufactured and installed at a very cost-efficient price.

SmartConductor affects a decrease in line sag during the high temperature operation that maybe transmitted through several adjacent spans, depending on construction specifics.

How SmartConductor Functions

SmartConductor is activated by the same temperature changes that cause a conductor to sag—ambient conditions and line current. The device is passive—there are no motors or electronic controls. The actuator (which uses Shape Memory Alloy) is thermally-affected such that its length decreases as a function of line temperature, producing a pull on the line and thereby compensating for sag. As line temperature returns to normal, SmartConductor returns to its original length and therefore automatically resets itself. SmartConductor can be fitted in-line or between a fixed point on the tower and a power line suspended from the tower or as a complete replacement of an existing line or in a new installation.

EXAMPLE 1

Figure 2:
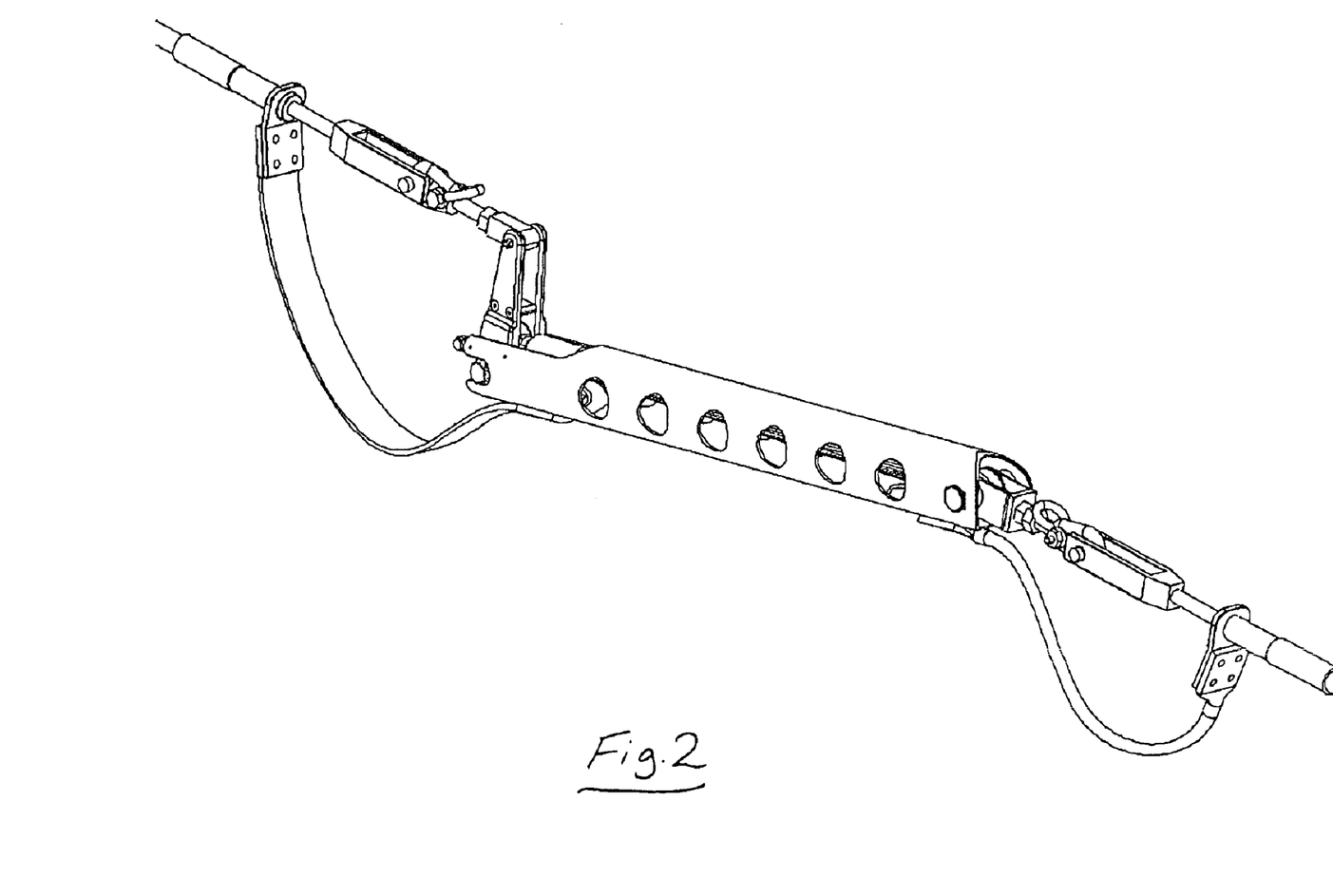
FIG. 2 depicts the SLiM device fully assembled as tested.
Figure 4:
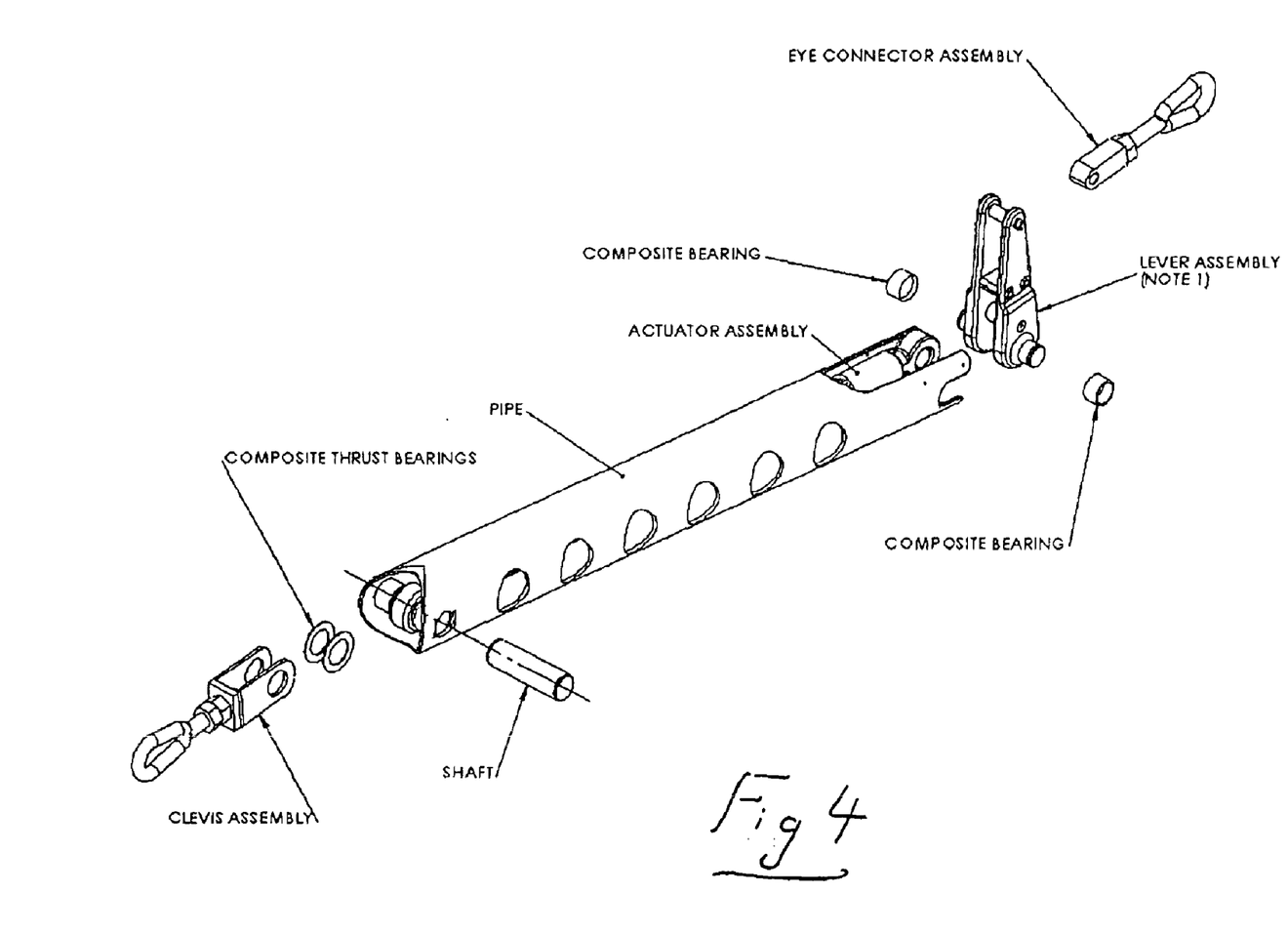
FIG. 4 is an assembly drawing of the SLIM device showing components.
Figure 5:
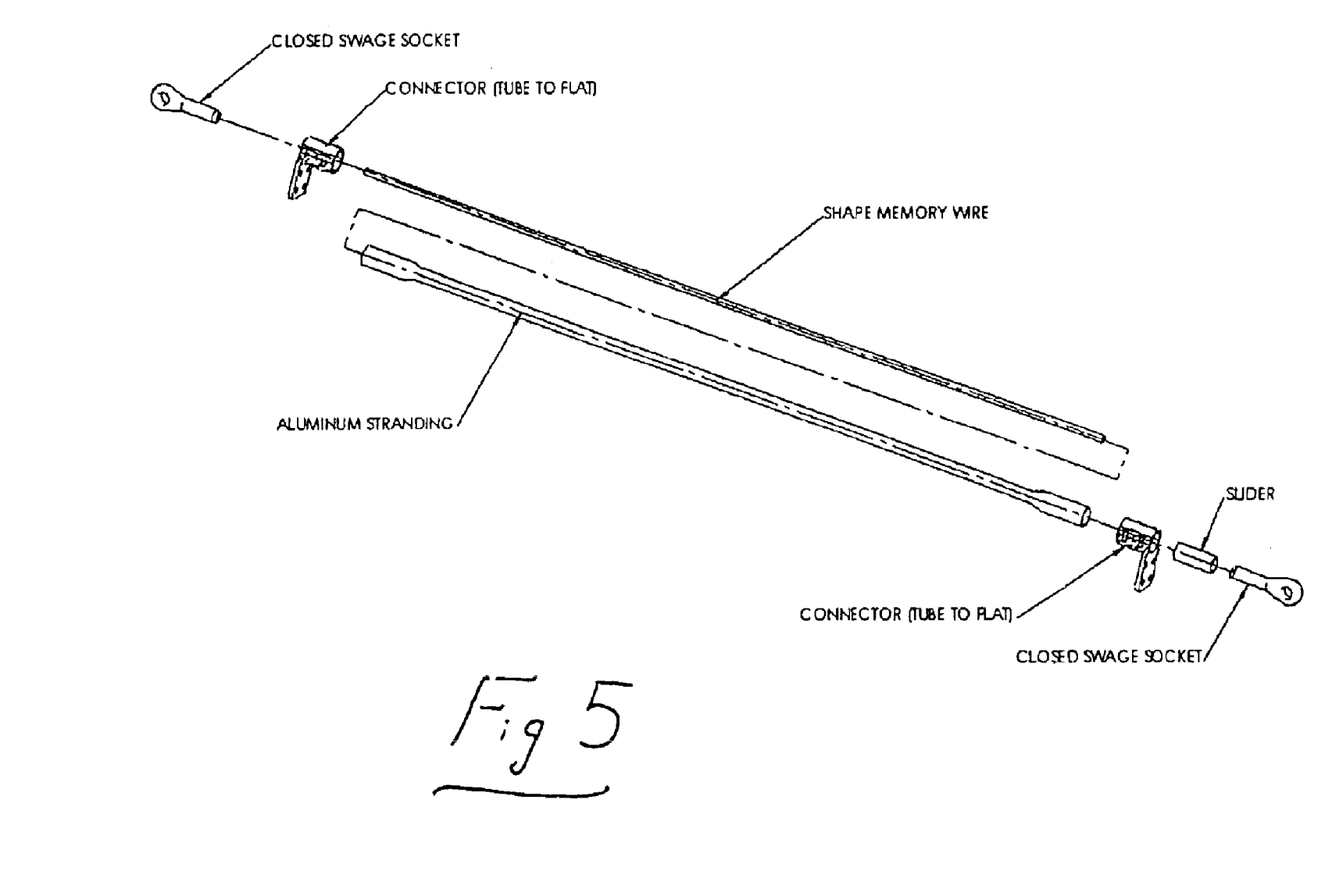
FIG. 5 is an assembly drawing of the SmartConductor device showing components.
Figure 6:
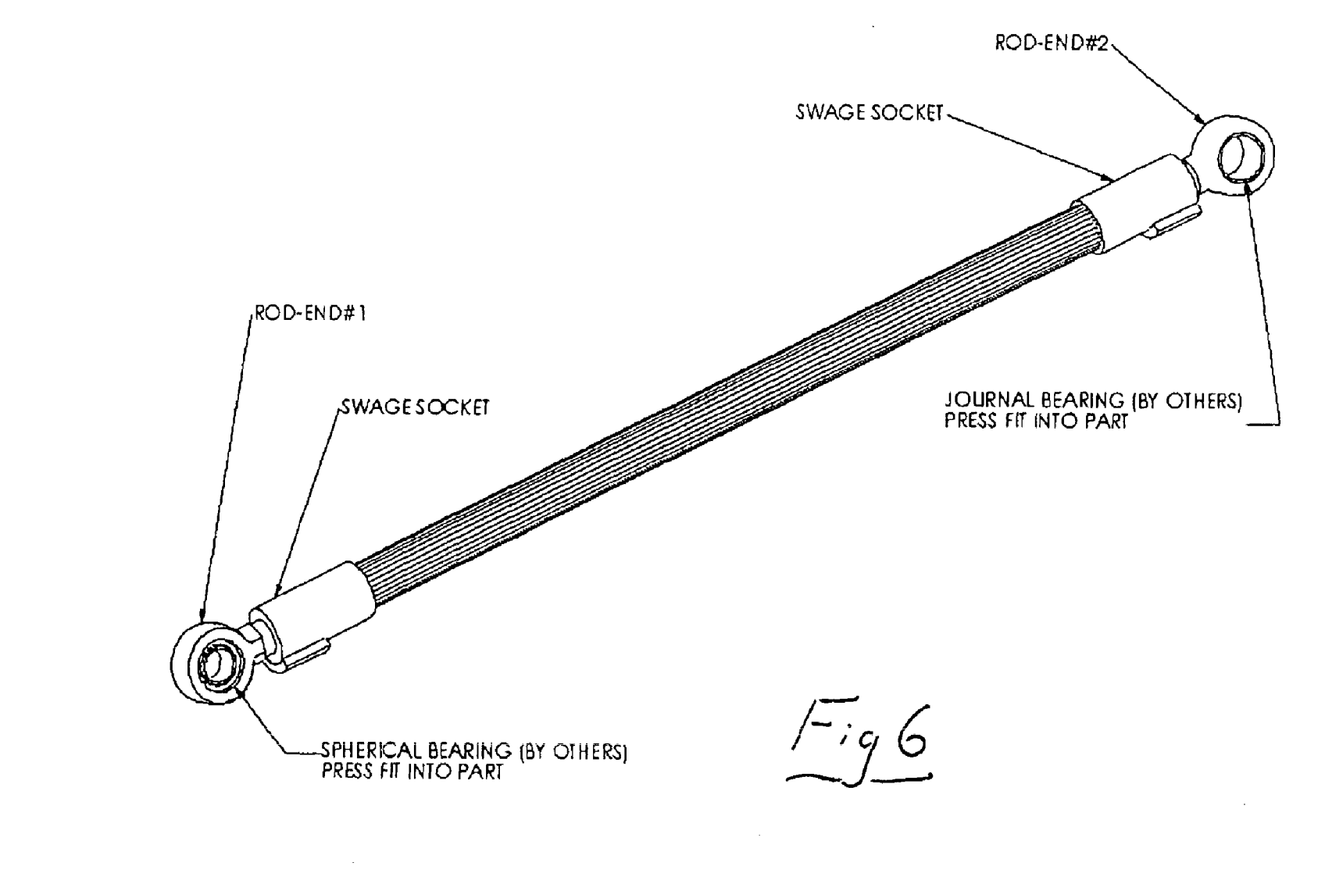
FIG. 6 depicts the Shape Memory Alloy actuator component for SLiM.

In one example of SLIM, as shown in FIGS. 2 and 4, the SMA element (actuator) is composed of a Nickel-Titanium alloy (also called NiTi or Nitinol). The actuator element is about two inches in diameter and three feet long and is made from about 80 NiTi wires, each having a diameter of about ⅛ inches. The ends of the wires are swaged into two compression fittings, which hold the wires parallel and transmit force and current to the wires. The body of the device is a pipe (a tubular housing) which transmits force and current, and which provides a fulcrum at one end, and which additionally reduces the corona emitted by the device. A lever, which pivots on the body, magnifies the length change in the SMA wires by about 5.5:1 in this example. The current required to heat the SMA wires through their transformation is passed through the wires. In this example, about one-third of the current is made to pass through the SMA element and the other two-thirds passes through the body of the device.

Note that this is merely an illustrative example, and different dimensions, geometries and materials may be used. For example, the SMA element (actuator) may be composed of any suitable material such as Nickel/Titanium alloys, Copper/Zinc/Aluminium Alloys, or Copper/Aluminium/Nickel Alloys. The actuator element may be about 0.25, 0.5, 1, 3, 5, or up to 8 inches in diameter. The length may be from 6 inches to 100 feet long, depending on the desired application, and for example may be about 1, 3, 5, 9, 12, 20, 40 or 80 feet long. It may be made from a bundle of wires which could include from one to several hundred wires, for example 1, 10, 30, 60, 80, 120, 200 or 300 wires may be used. Each wire may have a diameter of about 0.01 to about 2 inches.

EXAMPLE 2

SmartConductor

Figure 3:
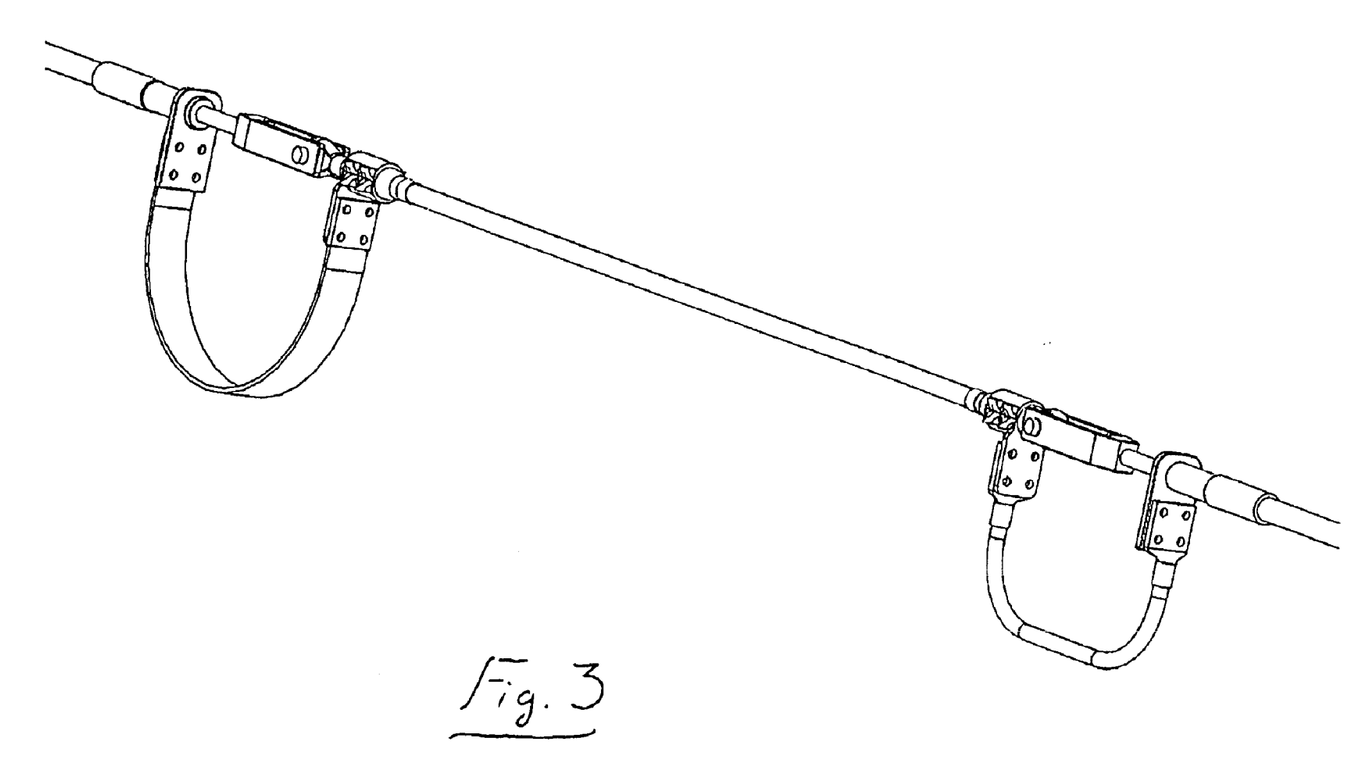
FIG. 3 depicts the SmartConductor device fully assembled as tested.

In one example of SmartConductor as shown in FIG. 3, the SMA element is a Nickel-Titanium alloy cable. The cable is about ⅝ inches in diameter and is made from about 19 NiTi wires, each having a diameter of about ⅛ inch. The ends of the wires are swaged into compression fittings, which transmit force to the wires and provide a connection to the conductor. The SMA element is wrapped inside 51 aluminum strands. The ends of the strands are held in compression fittings, which are electrically connected to the conductor and allow for sliding over the NiTi compression fitting. Current passes through the aluminum stranding and heats the SMA wires via conduction. This is sufficient to cause the required transition in the SMA.

Once again, this is merely an illustrative example, and the dimensions may vary, and may include any of the dimensions mentioned above for SLiM.

EXAMPLE 3

Test Procedures And Data

The objective of the functionality test was to verify that the SLIM and SmartConductor reduce excess sag as designed when operated on a live transmission line.

In the present test the SLIM device reduces the effective conductor length by approximately 6 inches, and the SmartConductor reduces effective line length by about 2 inches. Extensive research and development has resulted in two full-scale prototype devices—a SLIM prototype and a SmartConductor prototype. Proper function of these devices had been extensively investigated in a controlled and laboratory environment at Material Integrity Solutions' facilities. Field testing was completed by measuring the difference in sag between a test and control span, then comparing the difference to predicted values. The test was conducted on a 500 ft. span of 795kcmil 54/7ACSR (condor) conductor. A test and control span were strung to the same initial tension, then heated by applying current. Sag was measured throughout the test on both spans.

Details of Test

Figure 7:
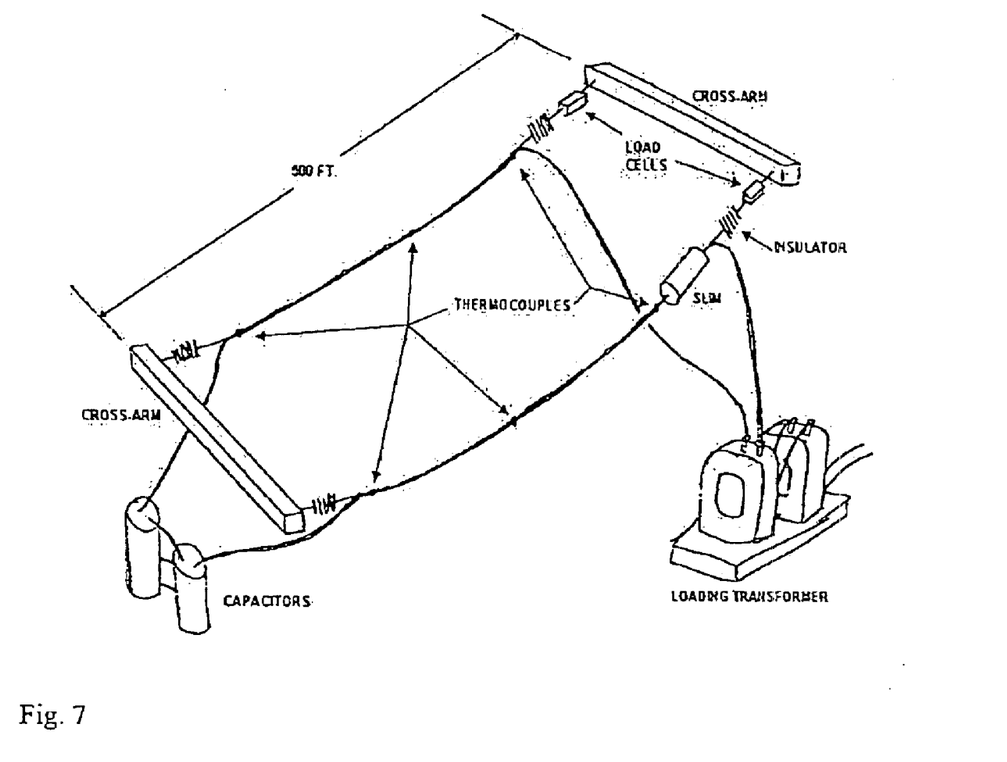
FIG. 7 depicts the set-up for functionality testing of the devices.
Figure 8:
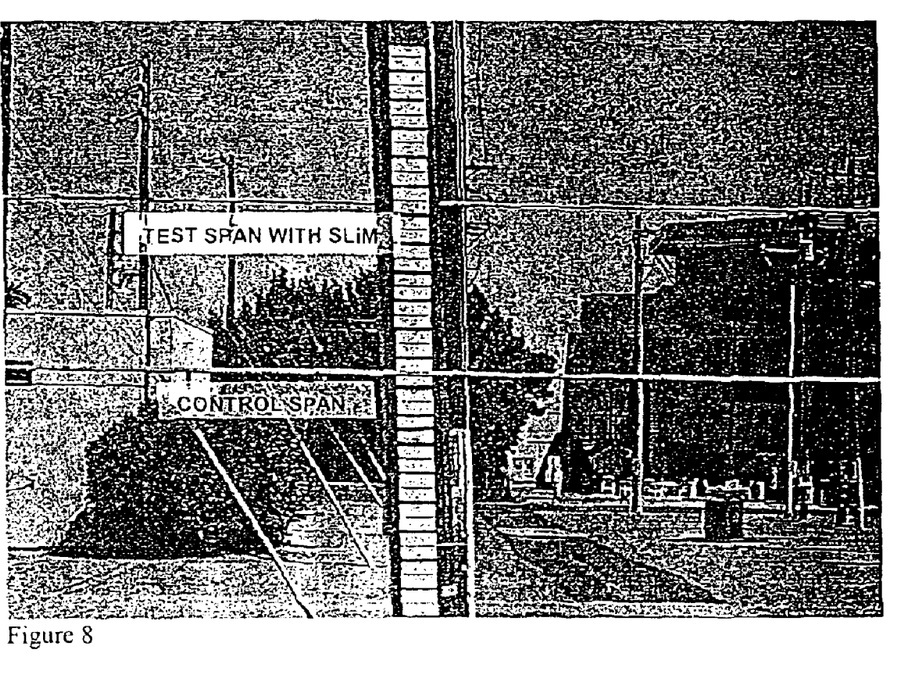
FIG. 8 is a photograph of the test, showing reduced sag on the experimental line when compared with the control line.

See FIG. 7. Line tensions were measured on each span using 10K lb. S-load cells (Totalcomp, Fair Lawn, N.J., Model TS-10K-SS). Three J-type thermocouples measured conductor temperature on each span, three additional thermocouples recorded ambient temperatures along the spans, five thermocouples measured temperatures on the SLiM device and two thermocouples measured the temperature of the SmartConductor. Current was measured using a coil transformer and voltage was monitored at the output of the loading transformer. Load cell, thermocouple, current and voltage signals were all routed through data logger hubs to a laptop computer where the data was monitored in real time. Wind speed and direction, and humidity were measured using a portable weather station. Data from the weather station was also ported to the laptop where it could be viewed in real time using FreeWX v1.08. All data channels were logged at one minute intervals.

Each device was installed, in turn, on the test span (FIGS. 2&3). Once a device was in place, both the test span and control span were brought up to the starting tension—5000 lbs. for SLiM and 2700 lbs. for SmartConductor—and the data acquisition was started. Current was then ramped up to 1000–1280 amps and maintained until the conductor temperature reached about 212° F. (100° C.). Current was then shut off, and the spans were allowed to cool back to ambient. Heights of the test and control spans midway between the poles were measured at the start of heating, periodically during heating, at 212° F., and at the end of cooling.

The increase in sag from the initial condition to 212° F. was calculated for both spans based on the manual measurements of midspan heights. The net effect of each tensioning device, or the "sag differential", was taken as the change in sag of the control span minus the change in sag of the test span.

The predicted effect of the SLIM and SmartConductor devices were calculated using in house software based on IEEE Std. 738-1993. Measured initial conditions were used as the inputs for the initial condition, and the thermal balance outlined in IEEE Std. 738-1993 was used to predict the change in sag for each span at the final measured temperature. The calculation included a change in span length during heating to account for cross-arm motion. Also, the predicted values for the test span included a reduction in the effective line length during heating to simulate the effect of the device. The amount of reduction in line length was based on lab tests in which the contraction of the device was measured as it was heated while under tension.

Results of Test

The sag differential between the test and control spans during the test of the SLiM was measured at 44 inches (Table 1). This closely matched the predicted value of 46 inches. Accounting for cross-arm motion due to difference in test and control span tensions during heating, the total differential in sag created by the SLiM device would have been 50 inches. During the test of the SmartConductor, sag differential was measured at 9.6 inches (Table 2) which was very near the predicted value of 9.8 inches.

TABLE 1

Tension, sag and sag differentials for the SLiM functionality test.

| | Control Span | | | Test Span | | | |
|---|---|---|---|---|---|---|---|
| Measured | Tension (lbs.) | Height* (in) | Change in Sag (in) | Tension (lbs.) | Height* (in) | Change in Sag (in) | Sag Differential (in) |
| Cold | 4731 | 152 | — | 4808 | 151 | — | — |
| Hot | 2685 | 87 | 65.0 | 3747 | 130 | 21.0 | 44.0 |
| Predicted | Tension (lbs.) | Sag (in) | Change in Sag (in) | Tension (lbs.) | Sag (in) | Change in Sag (in) | Sag Differential (in) |
| Cold | 4731 | 81.8 | — | 4808 | 80.2 | — | — |
| Hot | 2980 | 130 | 48.2 | 4699 | 82 | 1.8 | 46.4 |

*Height from ground at midspan.

TABLE 2

Tension, sag and sag differentials for the SmartConductor functionality test.

| | Control Span | | | Test Span | | | |
|---|---|---|---|---|---|---|---|
| Measured | Tension (lbs.) | Height* (in) | Change in Sag (in) | Tension (lbs.) | Height* (in) | Change in Sag (in) | Sag Differential (in) |
| Cold | 2917 | 98.6 | — | 2925 | 97.5 | — | — |
| Hot | 2073 | 41.5 | 57.1 | 2202 | 50 | 47.5 | 9.6 |
| Predicted | Tension (lbs.) | Sag (in) | Change in Sag (in) | Tension (lbs.) | Sag (in) | Change in Sag (in) | Sag Differential (in) |
| Cold | 2917 | 135 | — | 2925 | 135 | — | — |
| Hot | 2152 | 184 | 48.9 | 2274 | 174 | 39.1 | 9.8 |

*Height from ground at midspan.

SUMMARY, RAMIFICATIONS AND SCOPE

Accordingly, it will be apparent that the invention will automatically counteract the effects of line sag caused by thermal expansion of the line and will allow the building of fewer, shorter towers and will reduce the cost of retrofitting existing towers and will allow the transmission of higher currents during times of peak electricity demand.

The invention provides a means of mitigating power line sag which is considerably less expensive than current means; it provides a means of mitigating power line sag which is automatic and self-adjusting such that the same change in conditions (line current, ambient temperature, wind and solar radiation) that causes the line to sag will concomitantly cause the invention to act to mitigate the line sag; it provides a means of mitigating power line sag without the necessity of retrofitting transmission towers to make them taller; it provides a means of mitigating power line sag which will allow transmission towers to be spaced at greater intervals than is presently necessary, thereby necessitating the erecting of fewer transmission towers; it provides a means of mitigating power line sag which will allow the building of shorter transmission towers than is presently necessary; it also provides a means of mitigating power line sag without reducing line current (load).

Additionally, the invention is a relatively simple mechanical device, reducing the cost of manufacture and also reducing the probable need for maintenance. The invention is equally applicable to any suspended or hanging line, not just to a line carrying electric power.

The specificities in the above description should not be construed to limit the scope of the invention, but rather as examples of possible preferred embodiments. The sizes of the components may vary depending on the size of the tower to which the invention is fitted and the size of the voltage being carried in the power line. The materials used to construct the components may be as suggested above or may be any other materials with suitable mechanical and electrical properties. The actuator rod may be made of a number of substances which contract in response to increasing temperature such as metal alloys but may be made from other substances such as composite materials such as carbon fiber, glass fiber, or an electrically non-conducting metal-filled plastic and the like.

Thus, since numerous modifications and alternate embodiments will readily occur to those skilled in the art, the scope of the invention should not be limited by the aforementioned illustrative embodiments, but should be determined by the appended claims and their equivalents.

What is claimed is:

1. For reducing sag in a suspended cable, a sag-compensating device having a first end and a second end and comprising a shape memory alloy actuator disposed therebetween, wherein the actuator contracts as its temperature increases, and wherein the suspended cable is not strung continuously between the first end and the second end, and wherein at least one end is adapted to be connected, directly or indirectly to the suspended cable, and wherein the other end is adapted to be connected, directly or indirectly to either another section of the suspended cable or to a fixed point, wherein as the temperature of the actuator increases, the actuator contracts, and a pulling force is applied to the cable by the actuator, reducing sag in the cable.

2. The device of claim 1 wherein one end of the device is attached to a suspended cable and the other end is connected to a fixed point.

3. The device of claim 2 wherein the fixed point is a tower.

4. The device of claim 1 wherein the cable is a power line that carries a current.

5. The device of claim 4 wherein at least part of the current is conducted through the device.

6. The device of claim 4 wherein at least part of the current is conducted through the actuator.

7. The device of claim 4 wherein the device further comprises a structural element disposed between the first and second end of the device.

8. The device of claim 7 wherein the structural element is a tubular housing having a first end and a second end and wherein the tubular housing substantially surrounds the actuator, and contacts the shape memory alloy via a pivoted contact point at at least one end.

9. The device of claim 7 wherein the pulling force of the actuator is transmitted by at least one lever pivotally attached to the structural element.

10. The device of claim 9 wherein the device employs only a single lever.

11. The device of claim 1 wherein the pulling force of the actuator is transmitted to the line directly, without the use of a lever.

12. The device of claim 1 wherein the shape memory alloy comprises a binary nickel-titanium (NiTi) shape memory alloy.

* * * * *